United States Patent
Brown et al.

(10) Patent No.: US 9,199,394 B2
(45) Date of Patent: Dec. 1, 2015

(54) METHOD FOR THE MANUFACTURING OF A COMPOSITE

(75) Inventors: Scott C. Brown, Sacramento, CA (US); Andrew W. Cain, Birmingham, AL (US); Randell L. Thompson, Coco Beach, FL (US)

(73) Assignee: Southern Research Institute, Birmingham, AL (US)

( * ) Notice: Subject to any disclaimer, the term of this patent is extended or adjusted under 35 U.S.C. 154(b) by 1593 days.

(21) Appl. No.: 11/795,787

(22) PCT Filed: Jan. 25, 2006

(86) PCT No.: PCT/US2006/002336
§ 371 (c)(1),
(2), (4) Date: Dec. 22, 2008

(87) PCT Pub. No.: WO2006/081203
PCT Pub. Date: Aug. 3, 2006

(65) Prior Publication Data
US 2009/0098383 A1 Apr. 16, 2009

Related U.S. Application Data (60) Provisional application No. 60/647,079, filed on Jan. 26, 2005.

(51) Int. Cl.
| | |
|---|---|
| *B29C 43/12* | (2006.01) |
| *B29C 39/00* | (2006.01) |
| *B01J 13/00* | (2006.01) |
| *C04B 41/83* | (2006.01) |
| *C04B 35/524* | (2006.01) |
| *C04B 38/00* | (2006.01) |
| *C04B 38/06* | (2006.01) |
| *C04B 41/00* | (2006.01) |

(Continued)

(52) U.S. Cl.
CPC ............ *B29C 39/003* (2013.01); *B01J 13/0091* (2013.01); *C04B 35/524* (2013.01); *C04B 38/0032* (2013.01); *C04B 38/0615* (2013.01); *C04B 41/009* (2013.01); *C04B 41/4823* (2013.01); *C04B 41/83* (2013.01); *C04B 2111/00982* (2013.01); *C04B 2111/28* (2013.01); *C04B 2235/48* (2013.01); *C04B 2235/616* (2013.01); *Y10T 428/30* (2015.01)

(58) Field of Classification Search
None
See application file for complete search history.

(56) References Cited

U.S. PATENT DOCUMENTS

| | | | |
|---|---|---|---|
| 3,982,148 A | 9/1976 | Kaplan et al. | 313/330 |
| 4,049,613 A | 9/1977 | White | 260/37 N |

(Continued)

FOREIGN PATENT DOCUMENTS

| | | |
|---|---|---|
| AU | 2006208253 | 1/2006 |
| CA | 2595826 | 1/2006 |

(Continued)

OTHER PUBLICATIONS www.ultramet.com/old/8.htm. (dated Dec. 13, 2004).

(Continued)

*Primary Examiner* — Edmund Lee
(74) *Attorney, Agent, or Firm* — Ballard Spahr LLP (57) ABSTRACT

Described herein are composites that are relatively light-weight, high strength and low thermal conductivity. Also described herein are methods for the manufacture and use thereof.

16 Claims, 10 Drawing Sheets

(51) Int. Cl.
*C04B 41/48* (2006.01)
*C04B 111/00* (2006.01)
*C04B 111/28* (2006.01)

(56) References Cited

U.S. PATENT DOCUMENTS

| | | | |
|---|---|---|---|
| 4,150,905 A | 4/1979 | Kaplan et al. | 401/215 |
| RE30,626 E | 5/1981 | Kaplan et al. | 401/215 |
| 4,465,792 A | 8/1984 | Carr et al. | 521/138 |
| 4,595,623 A | 6/1986 | Du Pont et al. | 428/195 |
| 4,873,218 A | 10/1989 | Pekala | 502/418 |
| 4,917,968 A | 4/1990 | Tuffias et al. | 428/621 |
| 4,997,804 A | 3/1991 | Pekala | 502/418 |
| 5,081,163 A | 1/1992 | Pekala | 521/187 |
| 5,086,085 A | 2/1992 | Pekala | 521/187 |
| 5,154,970 A | 10/1992 | Kaplan et al. | 428/304.4 |
| 5,242,647 A | 9/1993 | Poco | 264/225 |
| 5,260,855 A | 11/1993 | Kaschmitter et al. | 361/502 |
| 5,275,796 A | 1/1994 | Tillotson et al. | 423/338 |
| 5,282,861 A | 2/1994 | Kaplan | 623/16 |
| 5,283,109 A | 2/1994 | Kaplan et al. | 428/216 |
| 5,358,802 A | 10/1994 | Mayer et al. | 429/218 |
| 5,372,380 A | 12/1994 | Duffy et al. | 280/740 |
| 5,382,285 A | 1/1995 | Morrison | 106/122 |
| 5,393,619 A | 2/1995 | Mayer et al. | 429/152 |
| 5,395,805 A | 3/1995 | Droege et al. | 501/72 |
| 5,402,306 A | 3/1995 | Mayer et al. | 361/502 |
| 5,409,683 A | 4/1995 | Tillotson et al. | 423/338 |
| 5,416,376 A | 5/1995 | Wuest et al. | 313/93 |
| 5,420,168 A | 5/1995 | Mayer et al. | 521/99 |
| 5,476,878 A | 12/1995 | Pekala | 521/61 |
| 5,508,341 A | 4/1996 | Mayer et al. | 524/596 |
| 5,529,971 A | 6/1996 | Kaschmitter et al. | 502/416 |
| 5,556,892 A | 9/1996 | Pekala | 521/181 |
| 5,601,938 A | 2/1997 | Mayer et al. | 429/40 |
| 5,626,977 A | 5/1997 | Mayer et al. | 429/44 |
| 5,636,437 A | 6/1997 | Kaschmitter et al. | 29/825 |
| 5,658,832 A | 8/1997 | Bernhardt et al. | 264/272.11 |
| 5,684,907 A | 11/1997 | Sprehn et al. | 385/123 |
| 5,686,031 A | 11/1997 | Coronado et al. | 264/40.1 |
| 5,731,360 A | 3/1998 | Pekala et al. | 521/54 |
| 5,744,510 A | 4/1998 | Pekala | 521/181 |
| 5,770,127 A * | 6/1998 | Abrams et al. | 264/29.1 |
| 5,780,157 A | 7/1998 | Tuffias et al. | 428/408 |
| 5,789,338 A | 8/1998 | Kasachmitter et al. | 502/418 |
| 5,851,947 A | 12/1998 | Hair et al. | 502/258 |
| 5,855,828 A | 1/1999 | Tuffias et al. | 264/29.1 |
| 5,876,793 A | 3/1999 | Sherman et al. | 427/213 |
| 5,898,564 A | 4/1999 | Mayer et al. | 361/508 |
| 5,908,896 A | 6/1999 | Mayer et al. | 524/596 |
| 5,928,799 A | 7/1999 | Sherman et al. | 428/655 |
| 5,932,185 A | 8/1999 | Pekala et al. | 423/445 R |
| 5,935,351 A | 8/1999 | Sherman et al. | 148/519 |
| 5,945,084 A | 8/1999 | Droege | 423/447.4 |
| 5,958,363 A | 9/1999 | Coronado | 423/592 |
| 5,973,015 A | 10/1999 | Coronado et al. | 521/64 |
| 5,980,832 A | 11/1999 | Andresen et al. | 422/91 |
| 6,005,012 A | 12/1999 | Hrubesh et al. | 521/53 |
| 6,040,266 A | 3/2000 | Fay, III et al. | 502/439 |
| 6,087,407 A | 7/2000 | Coronado et al. | 521/64 |
| 6,103,149 A | 8/2000 | Stankiewicz | 264/29.1 |
| 6,168,737 B1 | 1/2001 | Poco et al. | 264/129 |
| 6,206,531 B1 | 3/2001 | Williams et al. | 359/883 |
| 6,298,764 B1 | 10/2001 | Sherman et al. | 89/14.2 |
| 6,368,703 B1 | 4/2002 | Johnson | 428/316.6 |
| 6,467,731 B1 | 10/2002 | Harris et al. | 244/160 |
| 6,592,981 B1 | 7/2003 | Rawal et al. | 428/312.8 |
| 6,770,584 B2 | 8/2004 | Barney et al. | 501/95.1 |
| 2003/0134916 A1 | 7/2003 | Hrubesh | 521/50 |
| 2006/0014908 A1 | 1/2006 | Rotermund et al. | |

FOREIGN PATENT DOCUMENTS

| | | |
|---|---|---|
| CN | 200680009510.9 | 1/2006 |
| CN | 101146674 A | 3/2008 |
| EA | 200701592 | 1/2006 |
| EA | 200701592 A1 | 4/2008 |
| EP | 06733820.2 | 1/2006 |
| EP | 1841581 A2 | 10/2007 |
| FR | 2512441 A1 | 3/1983 |
| HK | 0810396101 | 4/2008 |
| HK | 1109883 | 6/2008 |
| IL | 184834 | 1/2006 |
| IN | 6049/DELNP/2007 | 1/2006 |
| JP | 2002-018356 A | 1/2002 |
| JP | 2002-511899 A | 4/2002 |
| JP | 2007-5531660 | 1/2006 |
| JP | 2008-511899 A | 4/2008 |
| MX | MX/a/2007/009036 | 1/2006 |
| MX | 2007009036 A | 9/2007 |
| TW | 095103130 | 1/2006 |
| TW | I430976 B | 3/2014 |
| WO | WO-95/06002 A1 | 3/1995 |
| WO | WO-99/01502 A1 | 1/1999 |
| WO | WO-01/09044 A1 | 2/2001 |
| WO | WO-02/083595 A2 | 10/2002 |
| WO | WO-2004/026792 A1 | 4/2004 |
| WO | PCT/US2006/002336 | 1/2006 |
| WO | WO-2006/081203 A2 | 8/2006 |

OTHER PUBLICATIONS www.ultramet.com/old/7.htm. (dated Dec. 13, 2004).
www.ultramet.com/old/composit.htm. (dated Dec. 13, 2004).
Cain, AW, Brown SC Incorporation of aerogel composites in thermal protection systems. Part I: aerogel processing, Cocoa Beach 2005.
U.S. Appl. No. 60/647,079, filed Jan. 26, 2005, Scott C. Brown (Southern Research Institute).
Pekala RW. (1989) Organic aerogels from the polycondensation of resorcinol with formaldehyde. *Journal of Material Science*, 24: 3221-3227.
U.S. Air Force Research Laboratory Contract/Grant No. F33615-99-C-5002.
Extended European search report issued by the European Patent Office on Mar. 12, 2013 for EP 06733820.2. (8 pages).

* cited by examiner

METHOD FOR THE MANUFACTURING OF A COMPOSITE

CROSS-REFERENCE TO RELATED APPLICATIONS

This application claims priority to U.S. provisional patent application Ser. No. 60/647,079 filed in the United State Patent and Trademark Office on Jan. 26, 2005, the disclosure of which is hereby incorporated by reference in its entirety for all purposes.

ACKNOWLEDGEMENTS

This invention was developed in part with intramural support from the U.S. Air Force Research Laboratory under Contract/Grant No. F33615-99-C-5002 and NASA-Langley Research Center under Contract No. NASI-02043. The United States Government may have certain rights in the invention.

FIELD OF THE INVENTION

Described herein are composites that are relatively lightweight, high strength, and possess low thermal conductivity. Also described herein are methods for the manufacture and use of the composites.

BACKGROUND OF THE INVENTION

Aerogels are excellent thermal insulators and have other exceptional physical properties. However, by themselves, aerogel materials are generally quite fragile and lack the required strength for various end use applications. To this end, there have been various attempts to strengthen aerogels, particularly by adding fibers to them when they are made, such as by the well known sol-gel processing, or infiltrating stronger porous structures with the aerogel precursor composition. The combination of these materials can provide a composite material that has overall improved properties relative to either the aerogel material or porous carbon structure material by itself. Further, these composite materials may be useful in a variety of applications such as thermal protection systems for spacecraft, etc., or as furnace insulation or fire protective barriers, as well as for thermal and sound insulation, and in electronic components such as supercapacitors.

Such is the case of a composite of an organic aerogel and a carbon foam material, reticulated vitreous carbon (RVC). The aerogel provides exceptional optical, thermal, acoustic, and electrical properties, whereas the RVC provides strength to the composite. Furthermore, the aerogel and the RVC can both be very lightweight. To this end, it is possible to make a composite of the aerogel with the RVC by infiltrating the aerogel precursor composition into the already processed RVC foam. However, conventional aerogel infiltration processes require large, capital-intensive processing equipment. Additionally, subsequent processing of the aerogel is known to cause shrinking and cracking of the aerogel, which can reduce the properties of the resulting composite.

Thus, described herein are methods for producing organic aerogel and RVC composites by a more readily scalable and cost effective process. The process can reduce the total processing time required to manufacture the composite and further reduces or eliminates the conventional shrinking and cracking of the composite.

SUMMARY OF THE INVENTION

Described herein are composites that are relatively lightweight, high strength, and possess low thermal conductivity and methods for the manufacture and use thereof.

Additional advantages of the invention will be set forth in part in the description which follows, and in part will be derived from the description, or may be learned by practice of the invention. Additional advantages of the invention, aside from those disclosed herein, will also be realized and attained by means of the elements and combinations particularly pointed out in the appended claims. It is to be understood that both the foregoing general description and the following detailed description, figures, and examples are exemplary and explanatory only and are not restrictive of the invention, as claimed.

BRIEF DESCRIPTION OF THE FIGURES

The accompanying drawings, which are incorporated in and constitute a part of this specification, illustrate several embodiments of the invention and together with the description, serve to explain the principles of the invention.

DETAILED DESCRIPTION OF THE INVENTION

The present invention may be understood more readily by reference to the following detailed description of preferred aspects of the invention and the Examples included herein and to the Figures and their previous and following description. However, before the present compositions, articles, devices and/or methods are disclosed and described, it is to be understood that this invention is not limited to specific synthetic methods, specific embodiments, or to particular devices disclosed herein, as such may, of course, vary. It is also to be understood that the terminology used herein is for the purpose of describing particular aspects of the invention only and is not intended to be limiting.

It must be noted that, as used in the specification and the appended claims, the singular forms "a," "an" and "the" include plural referents unless the context clearly dictates otherwise.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment.

In this specification and in the claims which follow, reference will be made to a number of terms which shall be defined to have the following meanings:

As used herein, the terms "optional" or "optionally" mean that the subsequently described event or circumstance may or may not occur, and that the description includes instances where said event or circumstance occurs and instances where it does not.

As used herein, by use of the term "effective," "effective amount," or "conditions effective to" it is meant that such amount or reaction condition is capable of performing the function of the compound or property for which an effective amount is expressed. As will be pointed out below, the exact amount required will vary from one aspect to another, depending on recognized variables such as the starting materials or compounds employed and the processing conditions observed. Thus, it is not always possible to specify an exact "effective amount" or "condition effective to." However, in view of the instant disclosure, it should be understood that an appropriate effective amount will be readily determined and/or optimized by one of ordinary skill in the art using only routine experimentation.

As used herein, the term "porosity" is intended to refer to the average number of pores-per-linear-inch (ppi) for a given material. As used herein, porosity can be measured for a reticulated vitreous carbon precursor, an organic aerogel, an organic aerogel and RVC foam composite, or a carbon aerogel composite.

As used herein, the phrase "reticulated vitreous carbon" (RVC) foam is an open pore foam material composed solely of vitreous carbon. Vitreous carbon is a form of glass-like carbon which combines some of the properties of glass with those of normal industrial carbons. RVC has a low relative density (3%), high surface area and rigidity, low resistance to fluid flow, and can withstand very high temperatures in non-oxidizing environments. RVC is commercially available in a wide range of pore size grades, ranging from approximately 5 PPI to approximately 100 PPI. For example, UltraPoam is a series of RVC products available from Ultraret, Inc. With respect to Ultrafoam, the RVC can have porosities of, for example, 10, 20, 45, 65, 80, or 100 ppi. RVC foam is exceptionally inert over a very wide temperature range, and has very low bulk thermal conductivity and high electrical conductivity. Its unusual rigid geometry provides a large surface area and low pressure drop for fluid flow. Additionally, the structure of RVC foam promotes its ability to hold infused materials within controlled porosity ranges.

As used herein, the phrase "reticulated vitreous carbon precursor" is any compound or mixture of compounds that upon thermal treatment (e.g., pyrolysis) is converted to reticulated vitreous carbon.

As used herein, the term "matrix" is intended to refer to a network of porous aerogel material in which the reticulated vitreous carbon component of the composite is embedded.

As used herein, the phrase "intimate contact" refers to an aerogel matrix that is at least substantially contacting at least a portion of a reticulated vitreous carbon precursor or reticulated vitreous carbon reinforcing structure.

As used herein, the term "infiltrate" refers to passing an organic aerogel precursor composition into a reticulated vitreous precursor by permeating the pore structure of the reticulated vitreous carbon precursor.

As used herein, the term "pyrolyze" or "pyrolysis" refers to the decomposition or transformation of an organic compound or composition to pure or substantially pure carbon caused by heat. Further, the term "substantially pure" with respect to carbon is intended to refer to at least greater than 80% pure, at least greater than 85% pure, at least greater than 90% pure, at least greater than 95% pure or even greater than 99% pure carbon.

As used herein, the term "carbon aerogel" refers to an organic aerogel which has been subjected to pyrolysis in order to decompose or transform the organic aerogel composition to at least substantially pure carbon.

Disclosed are compounds, compositions, and components that can be used for, can be used in conjunction with, can be used in preparation for, or are products of the disclosed methods and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. For example, if a number of different hydroxylated benzene containing compounds and a number of aldehydes are disclosed and discussed, each and every combination and permutation of the hydroxylated benzene containing compound and aldehyde are specifically contemplated unless specifically indicated to the contrary. Thus, if a class of molecules A, B, and C are disclosed as well as a class of molecules D, E, and F and an example of a combination molecule, A-D is disclosed, then even if each is not individually recited, each is individually and collectively contemplated. Thus, in this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all aspects of this disclosure including, but not limited to, steps in methods of making and using the disclosed compositions. Thus, if there are a variety of additional steps that can be performed it is understood that each of these additional steps can be performed with any specific embodiment or combination of embodiments of the disclosed methods, and that each such combination is specifically contemplated and should be considered disclosed.

In a first aspect, described herein is a method for producing an organic aerogel composite comprised of an organic aerogel and a reticulated vitreous carbon foam. According to the process, an organic aerogel precursor composition is infiltrated into a reticulated vitreous carbon precursor and then cured for a sufficient period of time under conditions effective to provide a cured or gelled aerogel. After curing, the aerogel is then processed and dried to at least substantially remove water to provide a matrix of porous organic aerogel polymer in intimate contact with the reticulated vitreous carbon precursor. In one aspect, following the drying of the aerogel, the dried and cured organic aerogel and reticulated vitreous carbon precursor composite can be pyrolyzed to at least substantially decompose the aerogel polymer and reduce the organic aerogel polymer to a substantially pure porous carbon matrix.

Conventional RVC precursors are commercially available and can be produced and/or obtained in a variety of sizes, shapes and configurations. Further, as one of skill in the art will appreciate, RVC precursors are also machineable to virtually any desired configuration. Exemplary methods for the production of RVC precursors suitable for use in the instant invention are disclosed and described in U.S. Pat. Nos. 6,103, 149; 6,040,266; and 5,372,380; the entire disclosures of which are hereby incorporated by reference in their entireties. In one aspect, the RVC precursor is a polymer produced by the reaction between a hydroxylated benzene and an aldehyde. In another aspect, the RVC precursor is a reticulated urethane impregnated with one or more resins. In another aspect, commercially available reticulated vitreous carbon precursors can be obtained from Ultramet, Inc, having anyone or more of the desired characteristics and/or properties set forth herein.

In one aspect, the RVC precursor suitable for use in the instant invention as well as the pyrolized composite comprises an average porosity in the range of from approximately 3 pores per inch ppi) to approximately 150 pores per inch (ppi), including without limitation such porosities as 5, 10, 15, 20, 25, 30, 35, 40, 45, 50, 55, 60, 65, 70, 75, 80, 85, 90, 95, 100, 105, 110, 115, 120, 125, 130, 135, 140, 145 and any range derived from these points. In another aspect, the RVC precursor suitable for use in the instant invention as well as the pyrolized composite has a bulk density in the range of from approximately 0.01 g/cm$^3$ to approximately 0.10 g/cm$^3$, including, without limitation, densities of 0.015, 0.02, 0.025, 0.03, 0.035, 0.04, 0.045, 0.05, 0.055, 0.06, 0.065, 0.07, 0.075, 0.08, 0.085, 0.09, 0.095 g/cm$^3$ and any range derived from these points.

Conventional aerogel precursor compositions are a mixture comprised of one or more hydroxylate benzene compounds, one or more aldehydes, one or more catalysts and water. To this end, any conventional aerogel precursor composition can be used with the instant invention. For example, in one aspect, the aerogel precursor composition comprises resorcinol as the hydroxylated benzene compound and formaldehyde as the aldehyde component. In an alternative aspect, the aerogel precursor composition can comprise phenol as the hydroxylated benzene compound and formaldehyde as the aldehyde compound. While any suitable catalyst known for use in the manufacture of aerogels can be used, in one aspect, sodium carbonate can be the catalyst component. Exemplary methods for the preparation of suitable aerogel precursor compositions are disclosed and described in U.S. Pat. No. 5,945,084, the entire disclosure of which is incorporated by reference herein for all purposes. In one aspect, the aerogel precursor comprises the potassium salt of 2,4-dihydroxybenzoic acid and formaldehyde.

Figure 1:
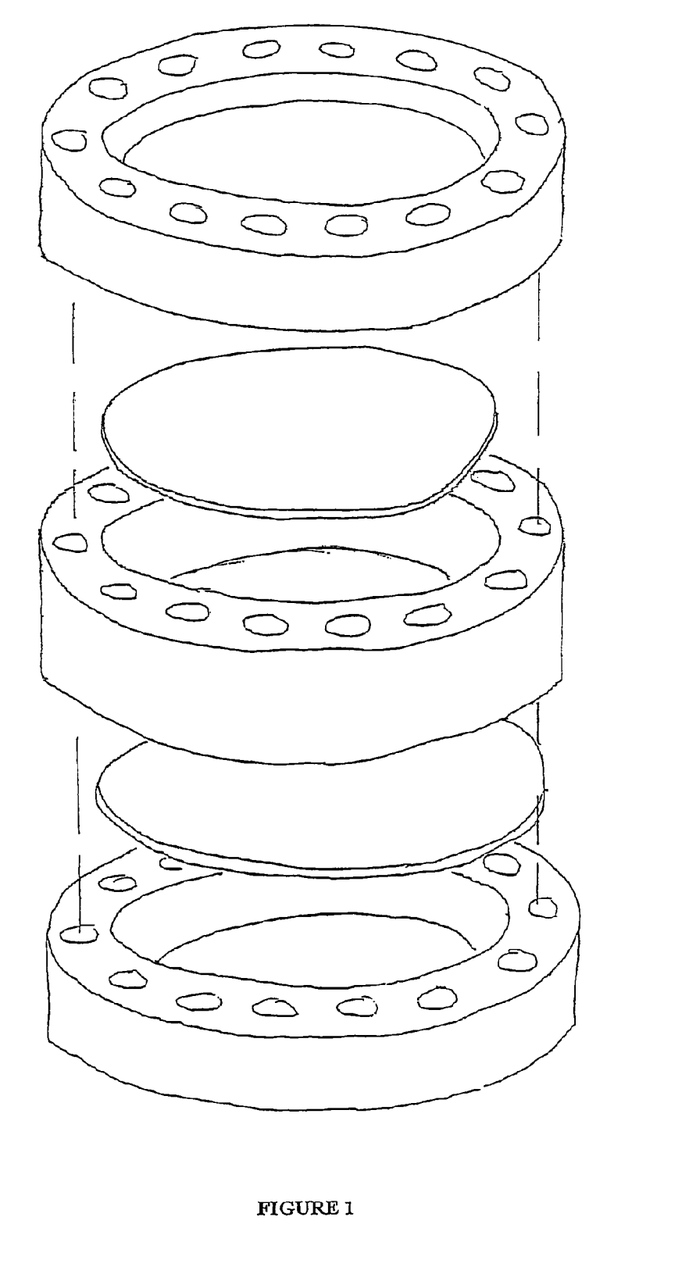
FIG. 1 shows a perspective of an unassembled flow cell.

In one aspect, in order to infiltrate the aerogel into the RVC precursor, the RVC precursor is first placed into a flow through mold or flow cell, such as, for example, that depicted in FIG. 1. As used herein, the term "flow cell" or "flow through mold" is intended to refer to any flow through device that is capable of supporting a reticulated vitreous carbon precursor during any one or more subsequent processing steps described herein. For example, in one aspect, the flow through cell can support the reticulated vitreous carbon precursor during infiltration with an organic aerogel precursor composition. In another aspect, the flow cell can be closed and used as a mold while curing an organic aerogel precursor composition. In another aspect, the flow cell is constructed and arranged to force subsequent aerogel processing fluids through a cured aerogel and RVC composite. To this end, in one aspect, the flow cell is constructed of polymeric material that is solvent resistant, resistant to conventional aerogel processing conditions such as increased pressures and elevated temperatures. Moreover, it should also be understood that a flow cell according to the instant invention can, in one example, be sized and shaped to support and or produce an organic aerogel composite having any desired size and shape.

Further, in still another aspect, it is envisioned that a flow cell according to the instant invention can be integrated into a pressure vessel system.

Figure 2:
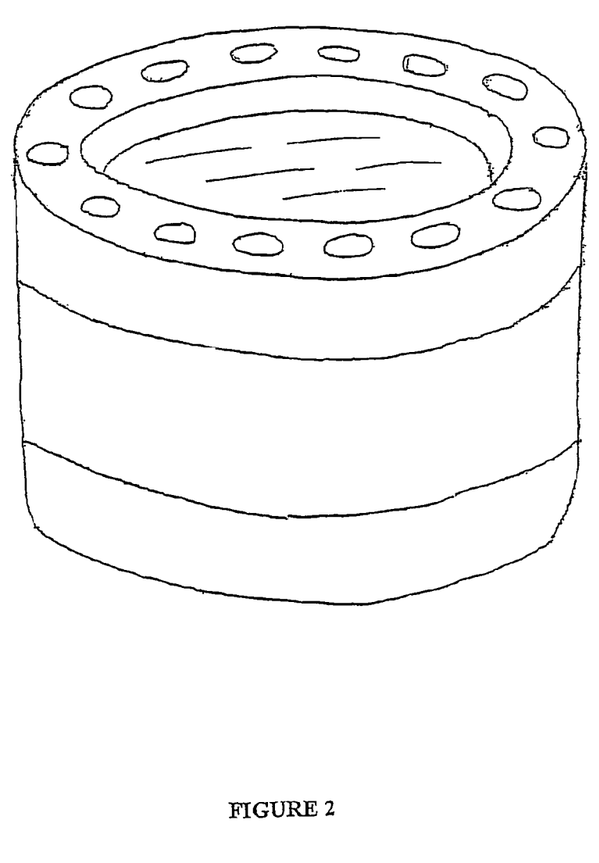
FIG. 2 shows a perspective of an assembled flow cell.

In one aspect, and as depicted in FIGS. 1 and 2 an exemplary flow cell comprises three polymeric rings that can be bolted together. To this end, any conventional polymeric material suitable for use in a flow through mold can be used. However, in one aspect, the flow through mold is comprised of Delrin® polymer, made commercially available from Dupont. A sintered stainless steel disc is held between each ring and supports the reticulated vitreous carbon foam to be infiltrated. It should be understood that while the flow cell mold of FIG. 1 is configured to receive a disc shaped reticulated vitreous carbon precursor, the flow cell can be constructed and arranged such that it can receive a reticulated vitreous carbon precursor having any desired size and shape.

In another aspect, the flow cell is composed of stainless steel and designed for large-scale production of the composite. In this aspect, inserts (e.g., Delrin®) are not needed.

In one aspect, the RVC precursor is secured in the flow cell and then evacuated. The aerogel precursor composition is then allowed to flow into the flow through mold to infiltrate and at least substantially fill the pores of the RVC precursor. In order to facilitate infiltration of the aerogel precursor into the RVC precursor, a vacuum can be applied. One advantage of using the flow cell approach is the reduction of processing fluids used to ultimately produce the aerogel composite.

In one aspect, after the RVC precursor has been infiltrated by the aerogel precursor composition, the flow through mold is then closed and the aerogel precursor composition is heated for a sufficient period of time and to a sufficient temperature to cure the aerogel precursor composition. The organic aerogel can be heated, for example, using any conventional means. Alternatively, a continuous flow apparatus can be used. In one aspect, the closed flow mold is itself a heat resistant container such that the entire flow cell, which contains the RVC precursor infiltrated with the organic aerogel precursor composition, can be placed in a thermostat controlled oven. To this end, no special atmosphere is typically required during curing.

In another aspect, the RVC precursor can be placed in a "soft mold," which is a frame used to reinforce the RVC precursor. In this aspect, the soft mold containing the RVC precursor is placed in a vacuum bag. The aerogel precursor is then added to the RVC precursor, and a vacuum is then applied to remove excess aerogel precursor and the vacuum bag is tight. The bag containing the mold can then be transferred to an oven for subsequent heating and curing. The soft mold can be made of various materials such as, for example, stainless steel. The use of the soft mold permits the formation of virtually any shape or size without significant tooling costs.

As one of ordinary skill in the art will appreciate, the cure cycle, i.e., the required cure time and temperature profile, will depend on the specific aerogel precursor composition used. In one aspect, the curing cycle comprises heating the closed mold (e.g., flow cell or soft mold) to a curing temperature in the range of from approximately 60° C. to approximately 100° C., including without limitation, such temperatures as 65° C., 70° C., 75° C., 80° C., 85° C., 90° C. and 95° C. Additionally, the period of time required for curing the aerogel precursor composition can vary depending on the specific aerogel precursor composition used, the curing temperature and the quantity of aerogel precursor composition to be cured. In one aspect the period of time required to cure the aerogel precursor composition can be in the range of from approximately 2 hours to approximately 500 hours, including without limitation, such time periods as 5, 10, 15, 20, 25, 30, 35, 40, 45, 55, 60, 65, 70, 75, 80, 85, 90, 95, 100, 150, 200, 250, 300, 350, 400, 450 hours, and any ranges derived from these points.

In one aspect, after curing, the organic aerogel polymer can be washed and dried by a flow through process in order to remove the remaining water and to provide a dry organic aerogel matrix that is in intimate contact with the reticulated vitreous carbon precursor. In one aspect, the flow through process first comprises a solvent exchange step to remove water from the organic aerogel composite. To this end, any organic solvent suitable to affect a solvent exchange with water can be used in the process of the instant invention. In one aspect of the invention, acetone is used to remove the water from the cured organic aerogel. Other solvents include, but are not limited to, light alcohols (e.g., ethanol, methanol, propanol, isopropanol). In one aspect, when a flow cell is used, the flow cell containing the cured aerogel composite is placed into a pressurized vessel, such as a Parr pressure vessel system. The pressure vessel is then filled with sufficient organic solvent to completely cover the organic aerogel. Under pressure, the organic solvent, such as, for example, acetone, is then forced through the flow cell or flow through mold in order to at least substantially remove any water present within the cured aerogel composite. The amount of organic solvent used and the duration/pressure of the washing step can be determined by one of ordinary skill in the art.

After the water has been at least substantially removed (e.g., greater than 80%, greater than 85%, greater than 90%, greater than 95% or even greater than 99% of the water) from the composite by solvent exchange with the organic solvent, in one aspect, the organic solvent can then be removed from the cured aerogel by a solvent exchange process with liquid carbon dioxide. In this aspect, the flow cell is again placed in a pressurized vessel and liquid carbon dioxide is forced through the flow cell. The pressure of the $CO_2$ can be determined by one of ordinary skill in the art. In one aspect, this step is conducted at 800 psi at 20° C.

After the organic solvent has been at least substantially removed (e.g., greater than 80%, greater than 85%, greater than 90%, greater than 95% or even greater than 99% of the organic solvent) from the cured aerogel, the pressurized flow cell containing the aerogel composite and liquid carbon dioxide can then be processed to supercritical conditions in order to transition the liquid carbon dioxide to its gaseous phase. Once the carbon dioxide is at least substantially transitioned to the gaseous phase, the pressure within the flow cell system is then released at a temperature above the critical temperature for carbon dioxide to ensure that no liquid condensation forms within the cured aerogel. The resulting dried and cured composite comprises a dry organic aerogel matrix in intimate contact with the reticulated vitreous carbon precursor.

As will be appreciated upon practicing the flow cell methods described herein, processing the cured aerogel in the flow cell forces the processing fluids (i.e., organic solvent, liquid carbon dioxide, and gaseous carbon dioxide) to flow through the sintered steel discs of the flow cell and into the cured aerogel. This decreases the processing time associated with conventional evaporative drying methods that rely on relatively slow diffusion rates. For example, typical and conventional aerogel processing times have been known to take as long as approximately two months (60 days) to complete. However, when using the flow-through processing method, the total processing time required to provide the dry organic aerogel and reticulated vitreous carbon foam composite can be reduced to approximately two weeks or even less. Moreover, the flow-through process limits or even eliminates shrinkage of the organic aerogel matrix during the processing phase and can thus provide an organic aerogel composite as one material with substantially no separation.

If desired, pyrolysis of the organic aerogel and RVC precursor composite can be performed using conventional means to form a carbon aerogel composite, which is referred to herein as a pyrolyzed composite. In one aspect, the low density dried and cured aerogel is placed in a thermostatted oven, and heated under a compatible atmosphere to a pyrolysis temperature for a pyrolysis time. The term "compatible atmosphere," as used herein, pertains to any atmosphere that will permit the high temperature pyrolysis of the cured and dried organic aerogel in order to form a low density open cell carbon aerogel composite. In one aspect, the compatible atmosphere is non-oxidizing. A compatible atmosphere may be relatively inert, for example, dry nitrogen. Alternatively, a compatible atmosphere can be a reducing atmosphere, such as, for example, hydrogen. The pyrolysis temperature can vary according to the pyrolysis time, the specific composition of the dried and cured organic aerogel, and the quantity of the composite to be pyrolyzed. Typically, the pyrolysis temperature is from about 200° C. to 1,500° C., and includes any temperature gradients in between. The pyrolysis time can vary according to the pyrolysis temperature, the specific composition of the dried and cured organic aerogel, and the quantity of the composite to be pyrolyzed. In one aspect, the pyrolysis time is from about 1 to 24 hours.

In another aspect, the present invention provides an organic aerogel composite comprising a matrix of porous organic aerogel and reticulated vitreous carbon foam, wherein the matrix of porous carbon aerogel is in intimate contact with the reticulated vitreous carbon foam. The organic aerogel of the instant invention can be characterized by their relatively high surface area, relatively high strength, relatively low thermal conductivity and relatively high porosity. For example, the pyrolyzed organic aerogel and RVC foam composites described herein have a density in the range of 0.05 g/cm$^3$ to approximately 0.35 g/cm$^3$, including without limitation, a density of 0.10 g/cm$^3$, 0.15 g/cm$^3$, 0.20 g/cm$^3$, 0.25 g/cm$^3$, 0.30 g/cm$^3$ or any range derived from these points.

In another aspect, the pyrolyzed composites described herein have surface area in the range of from approximately 100 m$^2$/g to approximately 1000 m$^2$/g, including without limitation, surface areas of 150 m$^2$/g, 200 m$^2$/g, 250 m$^2$/g, 300 m$^2$/g, 350 m$^2$/g, 400 m$^2$/g, 450 m$^2$/g, 500 m$^2$/g, 550 m$^2$/g, 600 m$^2$/g, 650 m$^2$/g, 700 m$^2$/g, 750 m$^2$/g, 800 m$^2$/g, 850 m$^2$/g, 900 m$^2$/g, 950 m$^2$/g, or any range derived from these points.

One of the many advantages of the composites and methods described herein is the added strength and dimensional stability of the composite. For example, the failure rate of the composites described herein is about 5% during processing; whereas it is closer to 50% for neat aerogel. This is due to the dimensional stability of the composites as produced by the methods described herein. The high dimensional stability coupled with reduced thermal conductivity make the composites described herein useful in a variety of applications.

In still another aspect, the present invention provides several articles of manufacture comprised of the carbon aerogel composites described herein. For example, a thermal protection system comprised of the carbon aerogel composites described herein is contemplated. In one aspect, the thermal protection system is a tile comprising an aerogel composite as described herein. To this end, in one aspect, the thermal protection system tile can further comprise an oxidation protection system. In still another aspect, the thermal protection system tile can comprise a radiation protection system. As will be appreciated by one of ordinary skill in the art, in still another aspect it is envisioned that a thermal protection system of the instant invention can be used on a vehicle designed for space travel and subsequent re-entry into the earth's atmosphere.

It is also contemplated that the composites described herein can be used for the thermal management of fuel cells or internal combustion engines in automobiles or other machines. In another aspect, the composites described herein can be used in a membrane electrode assembly (MEA) material in a fuel cell stack. In a further aspect, the composites can be used in thermal recovery systems in automobiles or industrial plants. In another aspect, the composites can be used in electric capacitors or other electronic components. In one aspect, the composites can be used as catalysts or catalyst supports for pollution reduction or chemical processing. In another aspect, the composites can be used for thermal insulation for automobiles, residential or commercial buildings, public transportation, packaging, space exploration vehicles, or off-world structures.

EXAMPLES

The following examples and experimental data are put forth so as to provide those of ordinary skill in the art with a complete disclosure and description of how the oxidant diffusion devices disclosed and claimed herein are made, used and/or evaluated, and are intended to be purely exemplary of the invention and are not intended to limit the scope of what the inventors regard as their invention. Efforts have been made to ensure accuracy with respect to numbers (e.g., amounts, temperature, etc.) But some errors and deviations should be accounted for. Unless indicated otherwise, parts are parts by weight, temperature is in ° C. or is at ambient temperature, and pressure is at or near atmospheric.

Example 1

Bench Top (Low Pressure) Flow Cell and Stainless Steel Molds

1. The RVC precursor Ultrafoam, which is commercially available from Ultramet, Inc., was cut to fully fill four 200 ml stainless steel static molds and one 300 ml stainless steel flow cell.
2. Place RVC precursor in each mold and bolt the molds together.
3. Mix 2,000.0 g of water, 256.80 g of resorcinol, 392.80 g of formaldehyde, and 1.3607 g of sodium carbonate. Stir until all solids are dissolved and material is well mixed. This mixture is formulation 4 in Table 1. Table 1 also provides other aerogel precursor formulations.
4. Evacuate each mold to at least 29 inches of mercury vacuum, then using inlet valve, control flow of resin mix from (3) into mold until flow stops. Weigh each mold to ensure complete infiltration then place in 80° C. oven for 33 hours. Turn off oven and allow to cool overnight.
5. When cool, remove wet aerogel composite from static molds and place in at least 15 liters of acetone for diffusion. Exchange acetone daily for at least three days. After water is diffused out, remove aerogel from acetone and place in pressure vessel for carbon dioxide exchange. Seal vessel and fill with liquid carbon dioxide. Pump vessel pressure to 1,400 psi. Pump liquid carbon dioxide through pressure vessel, collecting and measuring effluent. When no acetone is in effluent, close the pressure vessel and heat to 50° C. Using the outlet valve, control the vessel pressure to under 1,800 psig. Hold at 50° C. for at least one hour, then bleed carbon dioxide from vessel at a rate of no more than 200 psig per hour. After the pressure is below 600 psig, cool the vessel to room conditions. When all pressure is relieved from the vessel, open and remove dried organic aerogel composite.
6. During acetone exchange of diffusion samples, attach cool flow cell to acetone feed vessel and pump. Control feed pressure to 50 psig and flow 2 liters of acetone through aerogel for four days. After washed, remove aerogel from flow cell and place in pressure vessel for carbon dioxide exchange. Seal vessel and fill with liquid carbon dioxide. Pump vessel pressure to 1,400 psi. Pump liquid carbon dioxide through pressure vessel, collecting and measuring effluent. When no acetone is in effluent, close the pressure vessel and heat to 50° C. Using the outlet valve, control the vessel pressure to under 1,800 psig. Hold at 50° C. for at least one hour, then bleed carbon dioxide from vessel at a rate of no more than 200 psig per hour. After the pressure is below 600 psig, cool the vessel to room conditions. When all pressure is relieved from the vessel, open and remove dried organic aerogel composite. Measure and weigh: (36 g, 3.33 in diameter, 1.62 in high).

Example 2

Soft Mold

Figure 3:
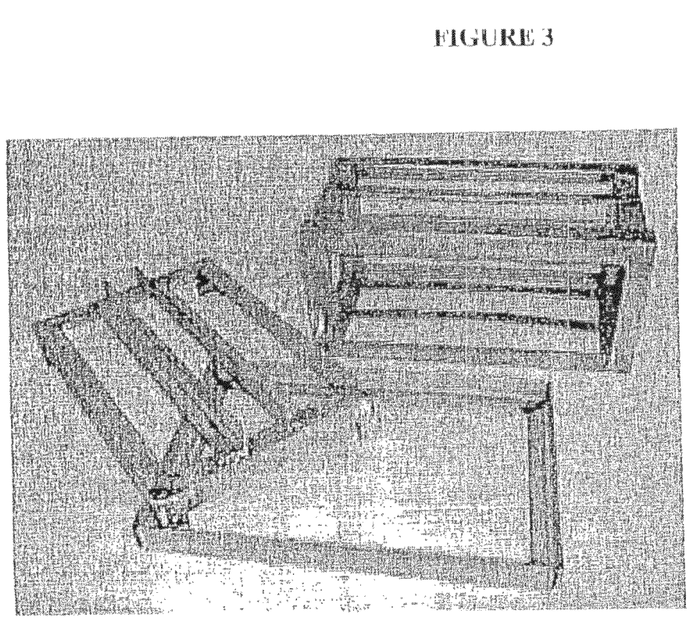
FIG. 3 shows a stainless steel aerogel composite processing tool for a soft mold process.

1. Cut 13.6×8.8×2.2" block of Ultrafoam. Place in soft mold frame. FIG. 3 depicts one aspect of the frames that can be used herein. Using appropriate materials, vacuum bag to infiltration plate. Using vacuum pump, pull greater than 29" Hg vacuum and let stand to ensure system holds vacuum.
2. Mix 2,000.0 g of water, 256.80 g of resorcinol, 392.80 g of formaldehyde, and 1.3604 g of sodium carbonate (formu-

TABLE 1

|  | 1 | 2 | 3 | 4 | 5 | 6 | 8 | ½ |
|---|---|---|---|---|---|---|---|---|
| Water | 1000 | 1000 | 1000 | 1000 | 1000 | 1000 | 1000 | 1000 |
| Resorcinol | 32.1 | 64.2 | 96.3 | 128.4 | 160.5 | 192.6 | 256.8 | 16.05 |
| Formaldehyde | 49.1 | 98.2 | 147.3 | 196.4 | 245.5 | 294.6 | 392.8 | 24.55 |
| Sodium Carbonate | 0.17 | 0.34 | 0.51 | 0.68 | 0.85 | 1.02 | 1.36 | 0.085 |
| Water | 100 | 100 | 100 | 100 | 100 | 100 |  |  |
| Resorcinol | 3.21 | 6.42 | 9.63 | 12.84 | 16.05 | 19.26 |  |  |
| Formaldehyde | 4.91 | 9.82 | 14.73 | 19.64 | 24.55 | 29.46 |  |  |
| Sodium Carbonate | 0.017 | 0.034 | 0.051 | 0.068 | 0.085 | 0.102 |  |  |
| Water | 2000 | 2000 | 2000 | 2000 | 2000 | 2000 |  |  |
| Resorcinol | 64.2 | 128.4 | 192.6 | 256.8 | 321 | 385.2 |  |  |
| Formaldehyde | 98.2 | 196.4 | 294.6 | 392.8 | 491 | 589.2 |  |  |
| Sodium Carbonate | 0.34 | 0.68 | 1.02 | 1.36 | 1.7 | 2.04 |  |  | lation 4 in Table 1). Stir until all solids are dissolved and material is well mixed. Add concentrated resin solution to 6,000 g of water. Stir until well mixed.

Figure 4:
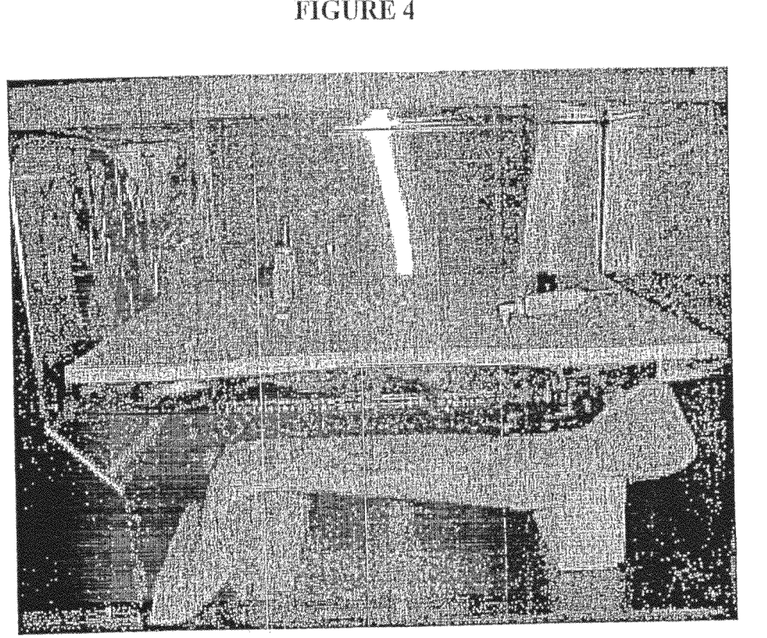
FIG. 4 shows a large aerogel composite in an oven.
Figure 5:
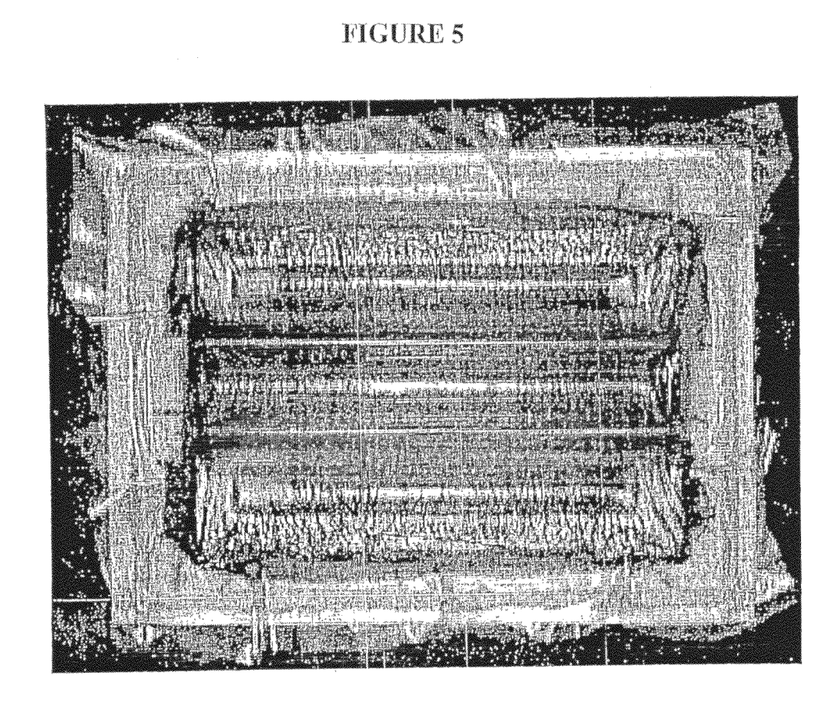
FIG. 5 shows a cured composite in a vacuum bag.

3. Using inlet valve to control, slowly fill the evacuated RVC precursor with the resin solution until all flow stops. Use vacuum pump to remove excess resin from mold until vacuum bag is tight again. Weigh to ensure complete infiltration, then place in 80° C. oven for two weeks. FIG. 4 depicts a large aerogel composite in the oven. FIG. 5 depicts the composite in the vacuum bag after curing.

Figure 6:
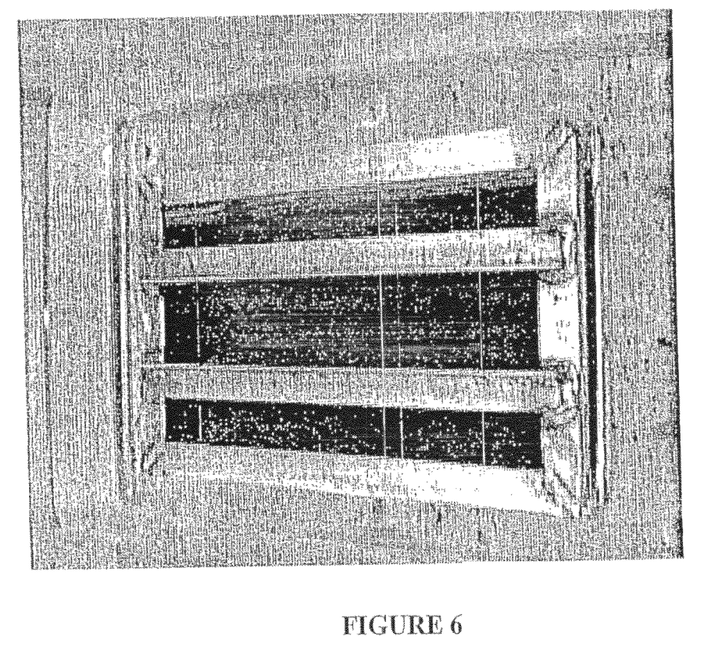
FIG. 6 shows an aerogel composite with a processing tool in a solvent wash.

4. Remove from oven. When cool, remove vacuum bag material and infiltration plate. Place wet aerogel composite and frame in at least 15 liters of acetone for diffusion. This aspect is depicted in FIG. 6. Exchange acetone daily for at least three days. After water is diffused out, remove aerogel from acetone and place in pressure vessel for carbon dioxide exchange. Seal vessel and fill with liquid carbon dioxide. Pump vessel pressure to 1,400 psi. Pump liquid carbon dioxide through pressure vessel, collecting and measuring effluent. When no acetone is in effluent, close the pressure vessel and heat to 50° C. Using the outlet valve, control the vessel pressure to under 1,800 psig. Hold at 50° C. for at least one hour, then bleed carbon dioxide from vessel at a rate of no more than 200 psig per hour. After the pressure is below 600 psig, cool the vessel to room conditions. When all pressure is relieved from the vessel, open and remove dried organic aerogel composite.

5. Place dried organic aerogel composite in carbonization furnace. Evacuate furnace, then purge with argon. Continuing argon purge, heat to 290° C. in 8 hours and hold for two hours, then heat to 490° C. for 8 hours and hold for two hours. Turn off furnace and allow to cool to room temperature. Measure carbonized aerogel to get 10.66×7.06×1.87" monolith that weighs 215.25 g. Using formulations 1 and 2 in Table 1, the following composites were produced: Formulation 1: 12.7 in×6.2 in×2.1 in/density of 0.13 g/cm$^3$. Formulation 2: 13.4 in×7.8 in×2.0 in/density of 0.09 g/cm$^3$.

Example 3

Computer-Aided Tomography of Composites

Figure 7:
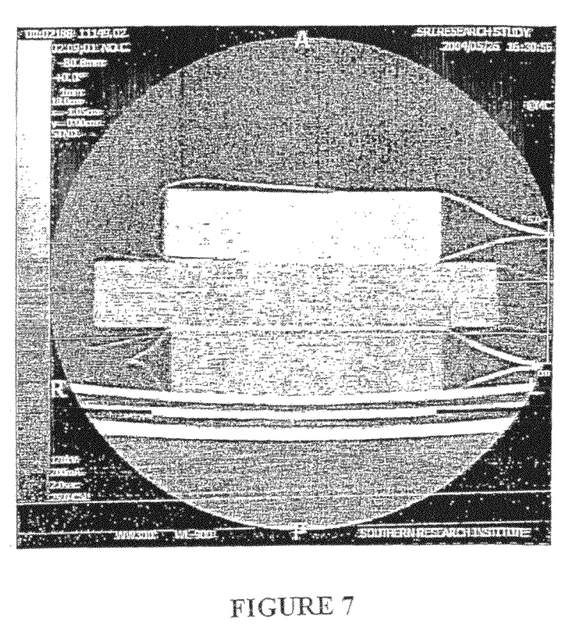
FIG. 7 shows a computer-aided tomography of three aerogel composites.
Figure 8:
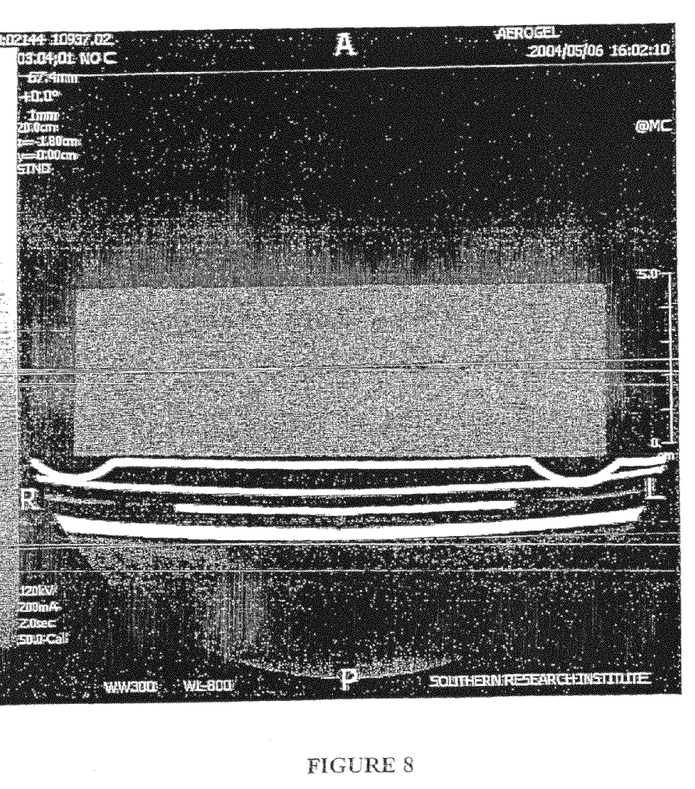
FIG. 8 shows a computer-aided tomography of a cross-section of an aerogel composite.
Figure 9:
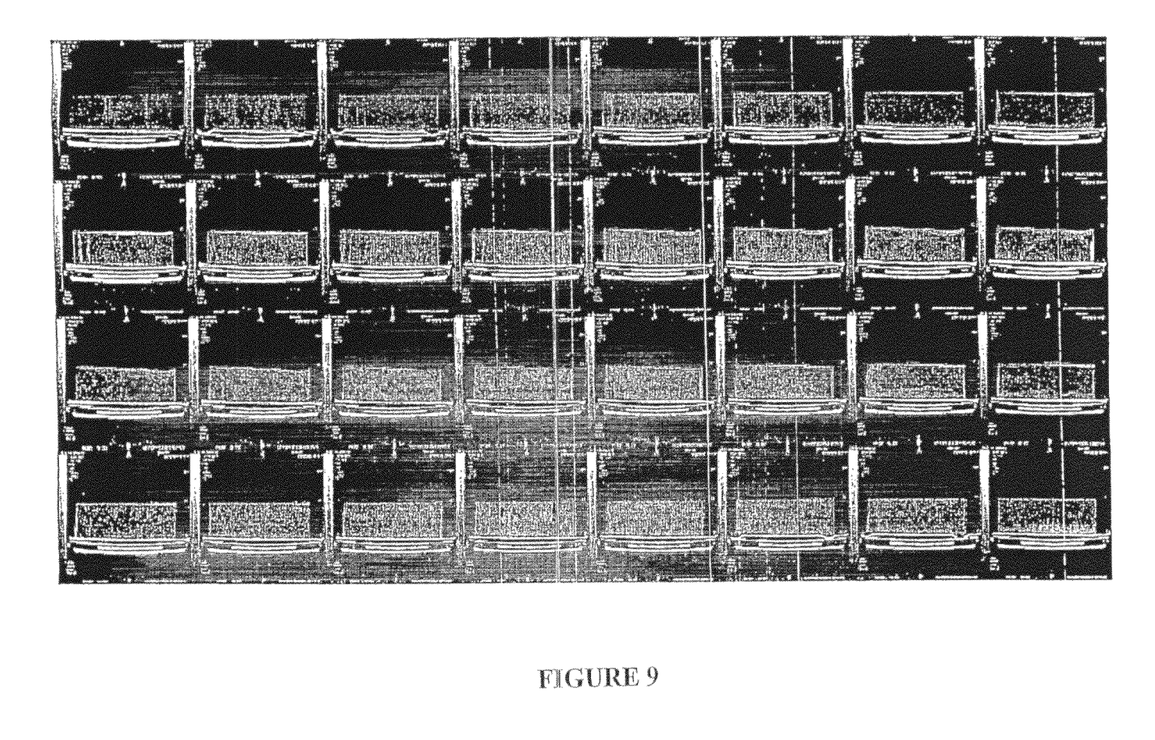
FIG. 9 shows a collage of computer-aided tomography scans of an aerogel composite.

Computer-aided tomography (CT scans) were performed to verify infiltration and consistency of the dried aerogel composites. FIG. 7 is the scan of three aerogel discs that were infiltrated in the stainless steel molds (flow cell). The top material was derived from formulation 4 (45 ppi; 0.18 g/cm$^3$), the middle material from formulation 2 (65 ppi; 0.09 g/cm$^3$), and the bottom material from formulation 2 (45 ppi; 0.13 g/cm$^3$). The foam texture can be seen, but no porosity can be seen in the aerogel. In FIG. 8, a more defined texture in the aerogel was observed when compared to than FIG. 7. This was verified visually, with the texture taking on the appearance of wormholes throughout the specimen. FIG. 9 also shows lines of increased density throughout the composite produced from formulation 2 (65 ppi; 0.09 g/cm$^3$). These were likely caused by the partial crushing of the tool and foam during the evacuation prior to infiltration.

Example 4

Thermal Conductivity Studies

Figure 10:
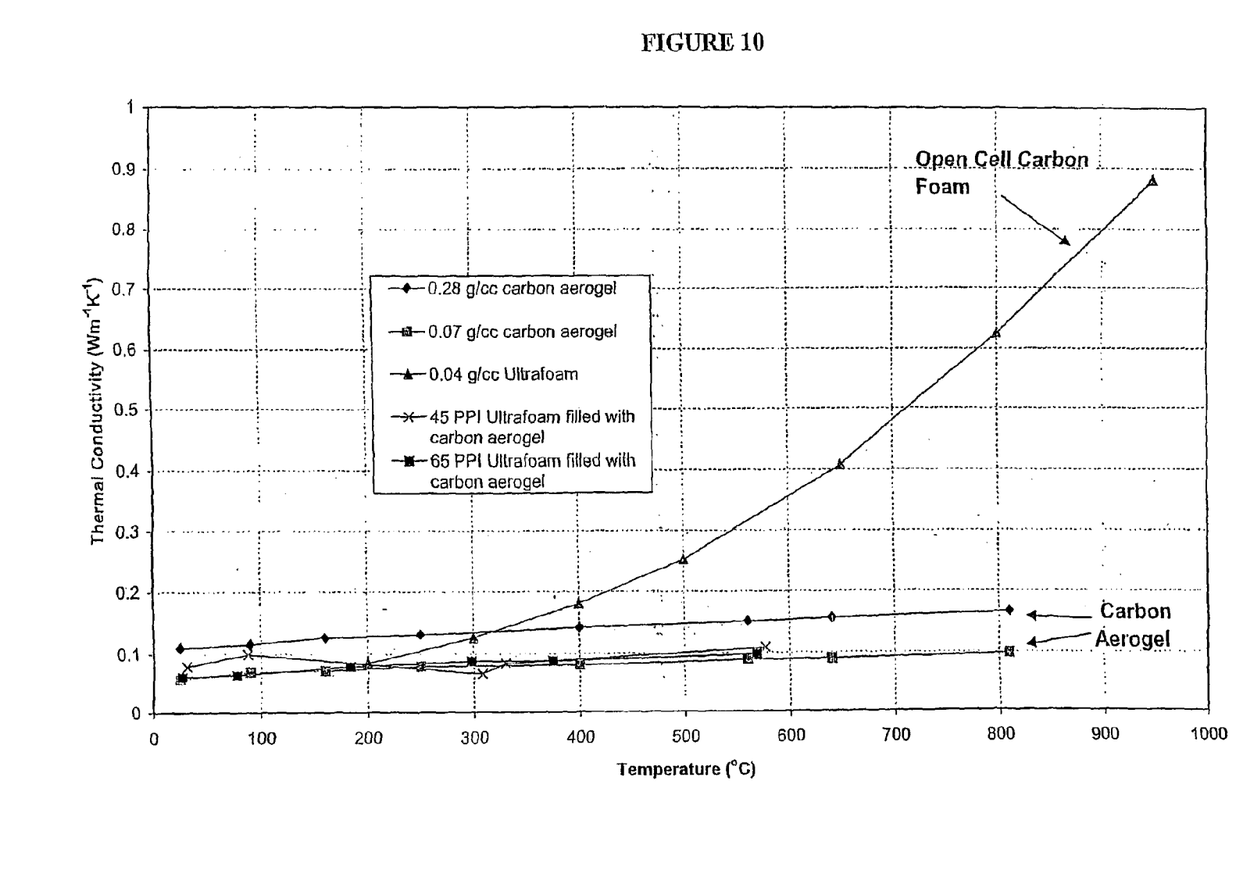
FIG. 10 shows a graph of thermal conductivity vs. temperature for carbon foams, carbon aerogels, and aerogels composites of the invention.

Referring to FIG. 10, two composites of the invention described herein (45 ppi and 65 ppi Ultrafoam filled with carbon aerogel 1 in Table 1) had a similar thermal conductivity when compared to just carbon aerogel. The open cell carbon foam Ultrafoam had a high thermal conductivity. The composites of the invention thus have a low thermal conductivity and dimensional strength, which are desirable properties.

Throughout this application, various publications are referenced. The disclosures of these publications in their entireties are hereby incorporated by reference into this application in order to more fully describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for the manufacture of a composite, comprising the steps:
   a) placing a reticulated vitreous carbon precursor in a flow cell capable of supporting the reticulated vitreous carbon precursor;
   b) infiltrating an organic aerogel precursor composition into the reticulated vitreous carbon precursor;
   c) curing the infiltrated organic aerogel precursor composition under conditions effective to provide a cured organic aerogel; and
   d) drying the cured organic aerogel under conditions effective to provide a dried and cured organic aerogel;
      wherein the dried and cured organic aerogel is in intimate contact with the reticulated vitreous carbon precursor, and wherein the infiltrating step and_curing step occurs in the flow cell.

2. The method of claim 1, wherein the reticulated vitreous carbon precursor comprises a porosity in the range of from approximately 3 pores per inch to approximately 150 pores per inch.

3. The method of claim 1, wherein the reticulated vitreous carbon precursor has a bulk density in the range of from approximately 0.01 to approximately 0.10 g/cm$^3$.

4. The method of claim 1, wherein the organic aerogel precursor composition comprises resorcinol and formaldehyde.

5. The method of claim 1, wherein the organic aerogel precursor composition comprises phenol and formaldehyde.

6. The method of claim 1, wherein prior to the infiltrating of step b), the reticulated vitreous carbon precursor is evacuated.

7. The method of claim 1, wherein the reticulated vitreous carbon precursor is evacuated in a flow cell.

8. The method of claim 1, wherein the organic aerogel precursor composition is infiltrated into the reticulated vitreous carbon precursor in a flow cell.

9. The method of claim 1, wherein the curing of step c) comprises heating the infiltrated organic aerogel precursor composition to a temperature in the range of from approximately 60° C. to approximately 100° C. for a period of time in the range of from approximately 2 hours to approximately 500 hours.

10. The method of claim 1, wherein the infiltrated organic aerogel precursor composition is cured in a flow cell.

11. The method of claim 1, wherein the reticulated vitreous carbon precursor comprises a reticulated urethane.

12. The method of claim 1, wherein step d) comprises:
i) washing the cured organic aerogel with an organic solvent to substantially remove water from the cured organic aerogel;
ii) washing the substantially water free cured organic aerogel of i) with liquid carbon dioxide to substantially remove organic solvent from the cured organic aerogel; and
iii) subjecting the substantially organic solvent free cured organic aerogel of ii) to supercritical conditions to substantially remove liquid carbon dioxide.

13. The method of claim 12, wherein step d) is performed in a flow cell and under pressure.

14. The method of claim 13, wherein step d) does not induce separation of the cured organic aerogel from the reticulated vitreous carbon precursor.

15. The method of claim 13, wherein the solvent comprises acetone.

16. The method of claim 1, further comprising pyrolyzing the dried and cured organic aerogel to provide a carbon aerogel composite comprised of a reticulated vitreous carbon embedded in a matrix of porous carbon aerogel.

* * * * *